United States Patent Office 3,415,553
Patented Dec. 10, 1968

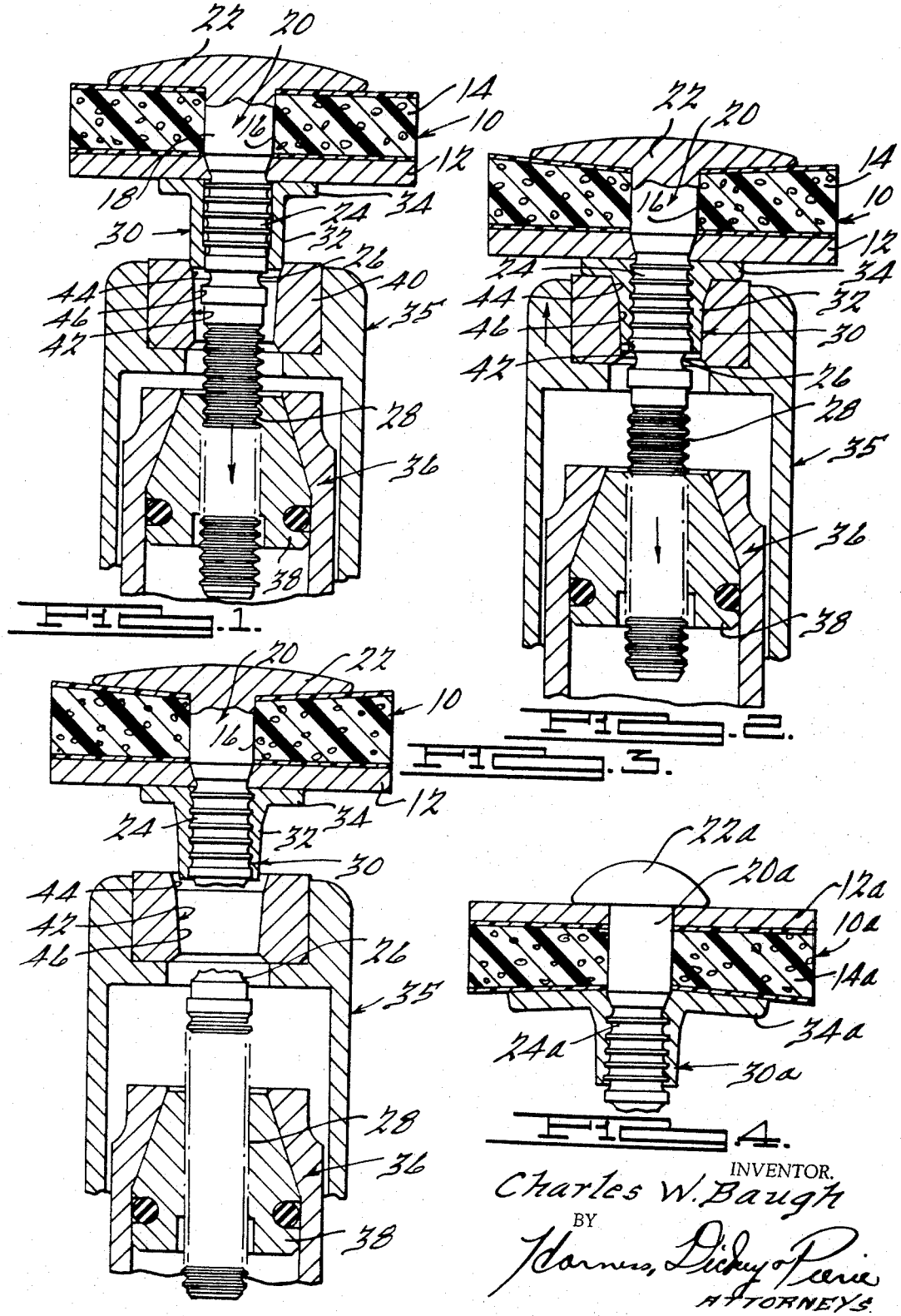

3,415,553
JOINT CONSTRUCTION
Charles W. Baugh, St. Clair Shores, Mich., assignor to Huck Manufacturing Company, Detroit, Mich., a corporation of Michigan
Filed June 2, 1966, Ser. No. 554,817
10 Claims. (Cl. 287—189.36)

ABSTRACT OF THE DISCLOSURE

A two-piece fastener including a pin and a collar adapted to be swaged into locking grooves on the pin with the fastener constructed for use with materials having a low compressive strength with the collar having a thin wall permitting swaging of the collar to the pin without crushing the low compressive strength material.

---

The present invention relates to a joint construction, and more specifically to a joint construction for a low compressive strength material and including a novel two-piece fastener of the lockbolt type.

It is desirable to apply fasteners of the lockbolt type to materials having a low compressive strength, i.e., as low as 200 p.s.i. and up to and around 4000 p.s.i. The lockbolt is a two-piece fastener including a pin and a collar which can be set by applying a relative axial force therebetween and at the same time swaging the collar onto the pin. With conventional installations it is desirable that the initial swaging or snubbing of the collar onto the pin be held off until a substantial relative axial force is built up; this feature is utilized to provide pull together of the workpieces being fastened. Thus with conventional lockbolt constructions, the snubbing or initial swaging forces required to swage the collar onto the pin are of such high magnitude that low compressive strength materials would be crushed.

It is an object of the present invention to provide a fastener of the lockbolt type for use with low compressive strength materials which can be set without excessive crushing of the material.

In general, one of the features of a modified fastener of the lockbolt type is that the collar is made of a reduced wall thickness. With conventional lockbolt constructions the tool utilized for swaging the collar onto the pin has an ejector member which is extensible over the pin and through the bore of the swaging anvil of the tool to engage the outer end of the collar after it has been swaged to thereby release the anvil from the collar. With the modified fastener the reduction in wall thickness requires the bore of the swaging anvil to be reduced and results in less clearance between the bore of the swaging anvil and the pin. This clearance is such that it is difficult to provide the tool with an ejector.

In view of the above, it is a general object of the present invention to provide for a novel joint construction for low compressive strength materials and to provide a modified two-piece fastener of the lockbolt type for use with low compressive strength materials having a compressive strength in the range of from 200 p.s.i. up to around 4000 p.s.i.

Other objects, features, and advantages of the present invention will become apparent from the subsequent description and the appended claims, taken in conjunction with the accompanying drawings, in which:

FIGURE 1 is a view with some parts shown in section and showing a portion of an installation tool in assembly relation with a two-piece fastener exemplifying the features of the present invention as shown mounted in a member having a low compressive strength;

FIGURE 2 is a view similar to FIGURE 1 depicting the fastener after the collar has been swaged onto the pin;

FIGURE 3 is a view similar to FIGURES 1 and 2 depicting the completion of the setting operation with the tool being shown removed from the collar; and FIGURE 4 is a view depicting a modified fastener construction.

Looking now to the drawings, a joint construction having a low compressive strength is generally indicated by the numeral 10 and in one form can be a structure having a generally solid outer shell member 12 which could be made of a high strength material such as metal, etc., and an inner laminated member 14 which could be of a suitable plastic, etc. which has a low compressive strength which would generally be within the range of 200 p.s.i. to approximately 4000 p.s.i. The joint or member 10 has a bore 16 therethrough in which is located a shank 18 of a pin 20 which has a substantially enlarged head 22 which engages the low compressive strength material 14. A portion of the shank 18 is located within the bore 16 while the remainder extends outwardly therethrough beyond the harder outer member 12. Except for the head 22, the pin 20 can be generally of a conventional construction and includes a plurality of annular locking grooves 24, a breakneck groove 26 and a plurality of pull grooves 28. A tubular collar member 30 is located upon the shank 18 of the pin 20 and with the pin 20 properly oriented within the bore 16 the collar 30 is located generally in alignment with the locking grooves 24. The collar 30 has a cylindrical portion 32 which is generally of a uniform outside diameter and an enlarged flange portion 34. Both the flange portion 34 and cylindrical portion 32 are of substantially the same wall thickness. In order to prevent crushing of the low compressive strength material 14, the collar 30 is constructed to have a low initial swage or snub load characteristic. To provide this characteristic the wall of the cylindrical portion 32 is made of a preselected minimum thickness. This thickness must provide sufficient material to fill the locking grooves 24 when the collar 30 is swaged onto the pin 20 and also have enough excess to provide sufficient strength for the fastener when it is set. At the same time the wall thickness of the collar 30 must be such as to permit initial swaging or snubbing of the sleeve portion 32 into the locking grooves 24 at an axial load at which the low compressive strength material 14 will not be crushed. It has been found that the proper initial swage characteristics can be attained when the wall thickness of the collar 30 is such that after final swage the material of the collar 30 will substantially fill the locking grooves 24 and will have a swaged outside diameter approximately thirty percent greater than the outside diameter at the crests of the locking grooves 24. Additionally, in order to minimize the magnitude of the initial swage or snub load the outer end of the cylindrical portion 32 is provided to have a generally straight outer surface and the inner surface is likewise generally straight and of a diameter close to the diameter of the crests of the locking grooves 24. Thus, the collar 30 is of such a construction that hold-off characteristics, normally provided in conventional collars for pull together, have been minimized.

The flange 34, with the joint assembly as shown in FIGURE 1, serves the purpose of engaging the anvil of the tool to thereby prevent excessive loads from being applied to the member 10. Also, in order to better distribute the load onto the low compressive strength material 14, the head portion 22 is substantially enlarged over that of conventional lockbolt pin heads. For materials having a compressive strength of 4,000 p.s.i., the head portion 22 should be approximately twice the diameter of the shank 18 of the pin 20. For materials of lesser strength the head portion 22 should be increased accordingly. With the fastener construction as shown, joints, such as joint 10, having members with compressive strengths as low as 200 p.s.i. can be secured without appreciably crushing the material and still resulting in a joint of adequate strength.

Collars such as collar 30 having a uniform wall thickness, etc., lend themselves to fabrication by stamping, i.e. rather than forging, therefore, resulting in a decrease in manufacturing costs and, hence, in the cost of the collar.

A tool (only partly shown) of a generally conventional construction can be used to set the collar 30 onto the pin 20 and is provided with a nose portion 35 which includes a plurality of conventional chuck jaws 38 which grip the pull grooves 28 of the pin 20 in a conventional manner. The swaging anvil 40 located at the front of the nose assembly 35, however, is of a modified construction. The anvil 40 has a through bore 42 which has a bell mouth portion 44 at its outer extremity and a swage portion 46 located adjacent thereto. The bell mouth portion 44 is provided to have an included angle of approximately 28 to 30° in accordance with conventional constructions to provide for ease of initial entry of the bore 42 onto the outer end of the collar 30. Because of the reduced thickness of the sleeve portion 32, its outer diameter is substantially reduced and the diameter of the swaging bore 42 is generally reduced relative to conventional constructions. At the same time the minimum thickness of the collar 30 permits the bell mouth 44 to initially snub or swage the outer end of the collar 30 at an axial load which is substantially reduced over conventional lockbolt constructions whereby crushing of the low compressive strength material 14 is prevented. With normal anvil constructions, the swage portion such as portion 46 adjacent to the bell mouth 44 is generally of a straight cylindrical construction; however, in the modified construction, as shown, this portion 46 is provided to have an included release angle in the range of from 4 to 6° which serves a purpose to be described.

It can be seen from the drawings that because of the reduced diameter of the swaging bore 42, the clearance remaining to provide an ejector member for ejection of the collar 30 from the pin 20 is slight. However, with the construction as shown no such ejector member is necessary. The small release angle in the portion 46 will provide for an automatic ejection of the anvil 40 from the collar 30, as will be described.

In FIGURE 2, the apparatus of FIGURE 1 is shown with the collar 30 swaged onto member 20. Note that the total length of the sleeve portion 32 is less than the total length of the bell mouth portion 44 and the adjacent swage portion 46 of the swaging bore 42 such that the sleeve portion 32 will be completely confined therein. After swaging of the collar 30 onto the pin 20 as shown in FIGURE 2, the relative axial force between the collar 30 and pin 20 is increased until the pin 20 fractures at the breakneck groove 26. When this occurs, the reaction force or shock reslting from the fracture is sufficient, along with the slight release angle in the swage portion 46, to cause ejection of the anvil 40 from the collar 30. By construction the swaging bore 42 such that the sleeve portion 32 is completely confined within the portions 44 and 46 and by providing the swage portion 46 to have an included angle between 4 to 6°, ejection can automatically occur. If the sleeve portion 32 extends beyond the swage portion 46 the collar 30 will stick and ejection will not occur.

Note that self-releasing angles are normally recommended to be approximately 14° and that included angles of from 4 to 6° are not considered self-releasing; the use of an angle of 14°, however, would impair the strength of the set fastener, for example by precluding adequate swaging of the material of the sleeve portion 32 into the locking grooves 24; at the same time an anvil with a 14° release angle would result in objectionable recoil of the tool upon pin break. In fact with the present construction, it has been found that with release angles generally over 6° the recoil of the tool at pin break is still objectionable while under 4° the anvil will not release from the collar. Thus, by taking advantage of the natural reaction or recoil of the tool at pin break and by providing for a slight release angle, i.e., approximately in the range of between 4 to 6°, self-releasing will occur without excessive kick to the operator. The self-releasing construction of the anvil 40 will operate effectively with conventionally constructed collars.

FIGURE 4 depicts a modified fastener construction in which the collar is employed to engage the low compressive strength material. In FIGURE 4 components serving similar functions to like components in FIGURE 1 are given the same numerical designation with the addition of the letter subscript $a$. In FIGURE 4, the pin 20$a$ is provided with a conventional sized head 22$a$ which is in engagement with the harder outer shell 12$a$ of the laminated member 10$a$ which has the low compressive strength layer 14$a$ located to be engaged by the collar 30$a$. The flange 34$a$ of the collar 30$a$ is provided to be substantially enlarged whereby crushing of the low compressive strength material 14$a$ is prevented. To accomplish this the flange 34$a$ of collar 30$a$ serves the additional function of providing a surface for engagement with the anvil of the setting tool.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a joint construction including a member having a low compressive strength, a fastener for securing the joint comprising a pin having a head at one end and a shank extensible through a bore in the joint, said shank having locking grooves, and a tubular collar for being swaged onto said locking grooves of said pin in response to a relative axial force between said pin and said collar, said collar having a cylindrical portion with an enlarged flange at one end, said collar being locatable on said shank with said cylindrical portion in alignment with said locking grooves and with said flange being closest to said head, one of said head and said flange being engaged with the member of low compressive strength and with said one being substantially enlarged and approximately at least twice the diameter of said crests of said locking grooves, said cylindrical portion having a preselected minimum wall thickness, said wall thickness being selected to provide at the opposite end of said cylindrical portion a low resistance to initial swaging of said opposite end into said locking grooves whereby the member of low compressive strength will generally not be crushed as said collar is swaged into said locking grooves by the relative axial force, said wall thickness selected to provide a volume sufficient to generally fill said locking grooves upon swaging and to provide an outside diameter no more than approximately thirty percent greater than the diameter of the crests of said locking grooves whereby the connection between said pin and said collar has adequate strength.

2. The fastener of claim 1 in which said cylindrical portion has a generally straight outer surface at said opposite end.

3. The fastener of claim 1 in which said cylindrical portion has a generally straight inner surface at said opposite end with said inner surface being of a diameter proximate to the diameter of the crests of said locking grooves.

4. The fastener of claim 1 with said cylindrical portion including said wall thickness being selected to provide initial swage with a minimum of crushing of a member having a compressive strength as low as approximately 200 psi.

5. The fastener of claim 1 with said cylindrical portion including said wall thickness being selected to provide initial swage with a minimum of crushing of a member having a compressive strength within the range of from approximately 200 psi to approximately 4,000 psi.

6. The fastener of claim 1 with said one of said head and said flange being said head.

7. The fastener of claim 1 with said one of said head and said flange being said flange.

8. The fastener of claim 1 with said wall thickness after swaging providing an outside diameter no less than approximately 130% of the diameter of the crests of said locking grooves.

9. The fastener of claim 8 with said wall thickness being generally the same for said flange and said cylindrical portion.

10. A joint construction comprising a member having a low compressive strength, a fastener for securing said member comprising a pin having a head at one end and a shank extensible through a bore in said member, said shank having locking grooves, and a tubular collar for being swaged onto said locking grooves of said pin in response to a relative axial force between said pin and said collar, said collar having a cylindrical portion with an enlarged flange at one end, said collar being locatable on said shank with said cylindrical portion in alignment with said locking grooves and with said flange being closest to said head, one of said head and said flange being engaged with the member of low compressive strength and with said one being substantially enlarged and approximately at least twice the diameter of said crests of said locking grooves, said cylindrical portion having a preselected minimum wall thickness, said wall thickness providing a volume sufficient to generally fill said locking grooves upon swaging, said wall thickness being selected to provide at the opposite end of said cylindrical portion a low resistance to initial swaging of said opposite end into said locking grooves whereby said member of low compressive strength will generally not be crushed as said collar is swaged into said locking grooves by the relative axial force, said wall thickness selected to provide a volume sufficient to generally fill said locking grooves upon swaging and to provide an outside diameter on more than approximately thirty percent greater than the diameter of the crests of said locking grooves whereby the connection between said pin and said collar has adequate strength.

References Cited

UNITED STATES PATENTS

| | | | |
|---|---|---|---|
| 2,764,045 | 9/1956 | Koenig | 85—37 |
| 3,066,568 | 12/1962 | Armour | 85—7 |
| 3,192,821 | 7/1965 | Siebol | 85—7 |
| 3,204,517 | 9/1965 | Looker | 85—77 |
| 3,215,024 | 11/1965 | Brilmyer et al | 85—7 |
| 3,313,197 | 4/1967 | Knohl | 85—9 |
| 2,955,505 | 10/1960 | Shuster | 85—37 |
| 2,409,180 | 10/1946 | Annett | 85—38 |

EDWARD C. ALLEN, *Primary Examiner.*

U.S. Cl. X.R.

85—7